Dec. 22, 1942. S. W. E. ANDERSSON 2,306,149
REFRIGERATION
Filed April 16, 1938
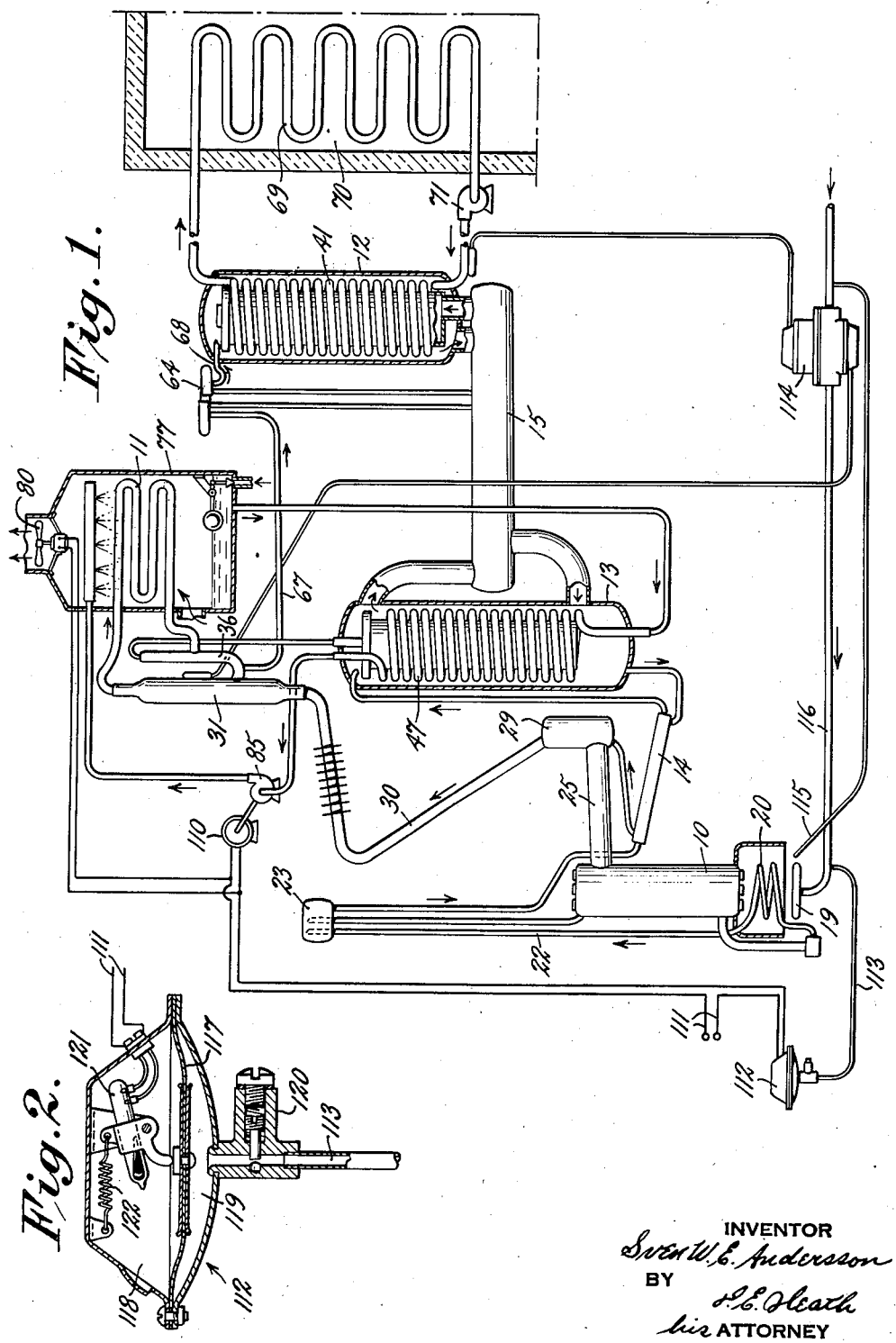
INVENTOR
Sven W. E. Andersson
BY
J. E. Heath
his ATTORNEY Patented Dec. 22, 1942

2,306,149

UNITED STATES PATENT OFFICE 2,306,149

REFRIGERATION

Sven W. E. Andersson, Evansville, Ind., assignor to Servel, Inc., New York, N. Y., a corporation of Delaware Application April 16, 1938, Serial No. 202,408

6 Claims. (Cl. 62—5)

My invention relates to refrigeration, and it is an object of the invention to provide a heat operated refrigeration system having control of cooling medium responsive to input.

Fig. 1 of the drawing shows more or less diagrammatically a uniform pressure type absorption refrigeration system embodying the invention. Fig. 2 is a detail sectional view of a part of the apparatus shown in Fig. 1.

The refrigeration system illustrated is generally like that described in application Serial No. 107,852 of Albert R. Thomas, now Patent No. 2,207,838 granted July 16, 1940. The description of the apparatus in said application is hereby incorporated in this specification. The system contains ammonia, water, and hydrogen. Other suitable fluids may be used.

In operation, ammonia vapor is expelled from solution in a generator 10 due to heating by a burner 19. The expelled vapor flows through an analyzer 25, vessel 29, conduit 30, and rectifier 31 into the upper end of condenser 11 in an evaporative water cooler 77. Ammonia vapor is condensed to liquid in condenser 11. The liquid ammonia flows into a rectifier trap 36. Liquid ammonia flows from trap 36 through conduit 67, precooler 64, and conduit 68 into the upper part of an evaporator 12. Liquid ammonia flows downward over coil 41 in evaporator 12 and evaporates and diffuses into hydrogen, producing a refrigeration effect on heat transfer fluid in coil 41. A pump 71 causes circulation of the heat transfer fluid through and between the coil 41 and a coil 69 in a refrigerator compartment 70 for cooling this compartment.

Gas circulates through and between the evaporator 12 and an absorber 13 by way of a gas heat exchanger 15. This circulation is caused by difference in specific weights of gas in different parts of this circuit. In the absorber 13 ammonia vapor is absorbed out of the hydrogen into weakened absorption solution which flows downward over coil 47. Absorption liquid circulates through and between the absorber 13 and generator 10 by way of a liquid heat exchanger 14. This liquid circulation is caused by a vapor liquid lift conduit 22 of which a lower coil portion 20 is heated by the generator burner 19. The vapor liquid lift causes upward flow of liquid from the lower part of generator 10 into an elevated circulation vessel 23 from which the liquid overflows into the absorber 13 through a conduit having a part forming an inner passage of the liquid heat exchanger 14.

Absorber 13 is cooled by flow of water from the evaporative cooler 77 through the absorber coil 47. Circulation of water through and between the evaporative cooler 77 and absorber 13 is caused by a pump 85 which is driven by an electric motor 110. A fan 80 for the evaporative cooler or spray tower 77 is also operated by an electric motor which is connected to conductors 111 in parallel with the pump motor 110. One motor may be used to drive both the pump and fan. The fan and pump motors are connected by the conductors or line 111 to a suitable source of electrical supply, not shown. In the line 111 is connected a switch 112.

The heater 19 is a gas burner which is turned on and off by a thermostatic valve 114 responsive to temperature of heat transfer fluid flowing from the refrigerator coil 69 to the evaporator 12. A pilot 115 maintains a small flame for lighting the burner 19 when gas is turned on by the thermostatic valve 114. The latter is adjusted so that the gas is turned off at a predetermined low temperature of fluid from coil 69 and turned on when this temperature increases a predetermined amount, for instance, to a value of 37° F.

The electric switch 112 is a pressure operated switch and is connected by a conduit 113 to a gas line 116 between a control valve 114 and burner 19, whereby the switch 112 is subjected to the pressure of fluid fuel in the gas line 116.

Referring to Fig. 2, the switch 112 comprises a casing divided by a flexible diaphragm 117 into an upper chamber 118 and a lower chamber 119. The upper chamber 118 is vented to atmosphere. The lower chamber 119 is connected to conduit 113 through an adjustable valve 120. In upper chamber 118 is pivoted a tilt type mercury contact switch 121 which is connected in line 111. The mercury switch 121 is held by a spring 122 in operative relation to the diaphragm 117. When the pressures on both sides of diaphragm 117 are equalized, the spring 122 tilts switch 121 so that the electric circuit is open and diaphragm 117 is held downward. This condition is shown in Fig. 2 and exists when burner 19 is turned off.

When the thermostatic valve 114 admits gas to conduit 116, and the burner is ignited, the increased pressure is transmitted through conduit 113 to chamber 119. This increased pressure is exerted on the under side of diaphragm 117. The increased pressure raises diaphragm 117, causing the mercury switch 121 to tilt toward the right and close the circuit 111. This starts the cooling circuit motors.

When the burner is turned off, the pressure below diaphragm 117 again drops to atmospheric pressure, and switch 121 opens the motor circuit to stop cooling of the absorber and condenser. This automatic control is particularly useful when coil 69 in the refrigerator compartment 70 is being operated at a temperature below freezing and it is desired to defrost this coil at intervals. By interrupting cooling of the absorber 13, the refrigeration temperature, and therefore the temperature of coil 69, increases more rapidly and a defrosting temperature is more quickly reached.

What is claimed is:

1. Refrigeration apparatus having energy for operation supplied both by combustion of gas in a burner and conversion of electricity, said combustion being controlled by changing the pressure of the gas supplied to said burner, a flexible wall subjected to change in pressure of said gas and movable in a substantially vertical direction by said change in gas pressure, and a tilt type mercury switch to control said electricity and so arranged that movement of said wall causes tilting of the switch.

2. Refrigeration apparatus having energy for operation supplied both by combustion of gas in a burner and conversion of electricity, said combustion being controlled by changing the pressure of the gas supplied to said burner, a movable wall formed by a substantially horizontal flexible diaphragm subjected to change in pressure of said gas so as to move up and down upon changes in the gas pressure, and a tilt type mercury switch to control said electricity and so arranged above said movable wall that movement of said wall causes tilting of the switch.

3. Refrigeration apparatus having both a gas burner and an electrically operated device to supply energy for operation of the system, a control for changing the pressure of gas supplied to said burner, and a second control for said electrically operated device and comprising a casing so connected as to be subjected to the pressure of gas supplied to said burner, a substantially horizontal flexible diaphragm so secured to said casing as to be subjected on its underside to said changes in gas pressure, and a tilt type mercury switch located above said diaphragm and arranged so that up and down movement of said diaphragm upon occurrence of said changes in gas pressure causes tilting of the switch.

4. Heat operated refrigeration apparatus having a heater comprising a gas burner, a valve for controlling flow of gas to said burner, a cooler arranged to take heat rejected by said apparatus, a flexible wall subjected to pressure of gas between said valve and said burner and movable in a substantially vertical direction upon change in said gas pressure, and a tilt type mercury switch to control said cooler and arranged so that movement of said wall causes tilting of the switch.

5. Heat operated refrigeration apparatus having a heater comprising a gas burner, a valve for controlling flow of gas to said burner, a cooler for taking heat rejected by said apparatus, a substantially horizontal flexible diaphragm subjected on its underside to pressure of gas between said valve and said burner, and a tilt type mercury switch to control said cooler located above said diaphragm and so arranged that up and down movement of said diaphragm upon changes in said gas pressure causes tilting of the switch.

6. An absorption refrigeration apparatus including a generator, a gas burner for heating said generator, a valve for controlling flow of gas to said burner, an electric motor for causing circulation of cooling fluid, a flexible wall subjected to pressure of gas between said valve and said burner and movable up and down upon change in said gas pressure, and a tilt type mercury switch to control said motor and so arranged that movement of said wall causes tilting of the switch.

SVEN W. E. ANDERSSON.